United States Patent
Morikaku et al.

(10) Patent No.: US 6,657,336 B2
(45) Date of Patent: Dec. 2, 2003

(54) MODIFIED OUTPUT TERMINAL STRUCTURE OF AC GENERATOR

(75) Inventors: Hideki Morikaku, Tokyo (JP); Atsushi Oohashi, Tokyo (JP); Yoshihito Asao, Tokyo (JP); Katsumi Adachi, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/964,734

(22) Filed: Sep. 28, 2001

(65) Prior Publication Data

US 2002/0113510 A1 Aug. 22, 2002

(30) Foreign Application Priority Data

Feb. 8, 2001 (JP) ..................... P2001-032079

(51) Int. Cl.[7] .................................................. H02K 7/10
(52) U.S. Cl. ..................... 310/68 D; 310/71
(58) Field of Search ................... 310/71, 68 D, 310/91

(56) References Cited

U.S. PATENT DOCUMENTS

| | | | |
|---|---|---|---|
| 3,850,501 A | | 11/1974 | Butterfield |
| 4,232,238 A | * | 11/1980 | Saito et al. ............... 310/68 D |
| 4,492,885 A | * | 1/1985 | Kitamura et al. ............. 310/62 |
| 4,683,390 A | * | 7/1987 | Imori et al. .................... 310/71 |
| 4,843,267 A | * | 6/1989 | Kaneyuki ................. 310/68 D |
| 4,859,894 A | * | 8/1989 | Akutsu et al. .............. 310/239 |
| 5,006,741 A | * | 4/1991 | Schott ....................... 310/68 D |
| 5,453,648 A | | 9/1995 | Bradfield |
| 5,659,212 A | | 8/1997 | DePetris |
| 5,883,450 A | * | 3/1999 | Abadia et al. ............ 310/68 D |
| 5,914,546 A | * | 6/1999 | Terakado et al. ............. 310/71 |
| 5,949,166 A | * | 9/1999 | Ooiwa et al. ............. 310/68 D |
| 6,060,802 A | * | 5/2000 | Masegi et al. ............ 310/68 D |
| 6,121,699 A | * | 9/2000 | Kashihara et al. ........ 310/68 D |
| 6,150,741 A | * | 11/2000 | Hayashi et al. ........... 310/68 D |
| 6,184,602 B1 | * | 2/2001 | Ooiwa et al. ............. 310/68 D |
| D449,090 S | * | 10/2001 | DelMonte ................... 173/145 |
| 6,426,575 B1 | * | 7/2002 | Masegi et al. ............ 310/68 D |
| 6,528,912 B2 | * | 3/2003 | Asao ......................... 310/68 D |
| 6,563,241 B2 | * | 5/2003 | Hayahi et al. ................ 310/71 |
| 2001/0019232 A1 | * | 9/2001 | Kurahashi et al. ............ 310/71 |
| 2001/0054853 A1 | * | 12/2001 | Hayashi et al. ............... 310/71 |
| 2002/0047360 A1 | * | 4/2002 | Kaizu ....................... 310/68 D |
| 2002/0113510 A1 | * | 8/2002 | Morikaku et al. ............ 310/91 |
| 2003/0015927 A1 | * | 1/2003 | Okuno et al. ............. 310/68 B |
| 2003/0062781 A1 | * | 4/2003 | Murata et al. ................ 310/71 |

FOREIGN PATENT DOCUMENTS

| | | | |
|---|---|---|---|
| EP | 0 562 909 | | 9/1993 |
| FR | 2 629 287 | | 9/1989 |
| JP | 03150040 A | * | 6/1991 ............ H02K/5/00 |
| JP | 58133147 | * | 8/1993 ............ H02K/11/00 |
| JP | 2511014 | | 6/1996 ........... H02K/19/36 |
| JP | 9-107654 | | 4/1997 ............ H02K/5/22 |
| JP | 2002136076 | * | 5/2002 ........... H02K/19/36 |
| JP | 2002136077 | * | 5/2002 ........... H02K/19/36 |

\* cited by examiner

Primary Examiner—Nestor Ramirez
Assistant Examiner—H. Y. Elkassabgi
(74) Attorney, Agent, or Firm—Sughrue Mion, PLLC

(57) ABSTRACT

A vehicle AC generator comprises a metal bush (43) having a bushing part (43a) loosely fitted onto an output terminal bolt (26) and a fixed part (43b) fixed to the output terminal bolt (26) on the opposite side of a vehicle side connecting terminal (42) of the bushing part (43a), wherein a fastening nut (44) is screwed onto a screw part (26b) on the take-out end part side of the output terminal bolt (26) so that the vehicle side connecting terminal (42) is held between the bushing part (43a) and the fastening nut (44).

15 Claims, 6 Drawing Sheets

MODIFIED OUTPUT TERMINAL STRUCTURE OF AC GENERATOR

BACKGROUND OF THE INVENTION

1. Field of the Invention

This invention relates to a vehicle AC generator, and particularly relates to an output terminal structure of a vehicle AC generator.

2. Description of the Related Art

FIG. 6 is an oblique perspective view showing a conventional rectifier applied to a vehicle AC generator, and FIG. 7 is a cross sectional view of the main part describing the state of attachment of a conventional rectifier.

In FIG. 6 and FIG. 7, a rectifier 120 comprises: a plurality of positive electrode side and negative electrode side diodes 20, 21 for full-wave-rectifying the three-phase AC; first and second cooling plates 122, 123 for cooling positive electrode side and negative electrode side diodes 20, 21, respectively; insulators 24, 27 for insulating the first and second cooling plates 122, 123; a circuit board 125; and an output terminal bolt 126. Here, the positive electrode side and negative electrode side diodes 20, 21 make up the first and second diodes, respectively.

The first cooling plate 122 is formed approximately like a horseshoe, and the positive electrode side diodes 20 are attached on the main surface 122a thereof side by side in the circumferential direction. Then, a heat radiating fin 122b is provided rising from the rear surface (surface on the opposite side of the main surface) of the first cooling plate 122. Furthermore, three flange parts 130, 131, 132 are provided at both end parts in the circumferential direction and at the middle part in the circumferential direction of the first cooling plate 122, respectively. Each of the flange parts 130, 131, 132 is provided so that it may rise up from the main surface 122a of the first cooling plate 122 and after that, it may extend outward in the radial direction. Then, an output terminal bolt inserting through hole 134 is pierced in the extending-out end in the radial direction of the flange part 130 provided at one end part in the circumferential direction of the first cooling plate 122, and attaching screw inserting through holes 133 are pierced in the extending-out ends in the radial direction of the residual flange parts 131, 132.

The second cooling plate 123 is formed approximately like a horseshoe with a diameter larger than that of the first cooling plate 122, and the negative electrode side diode 21 is attached on the main surface 123a thereof side by side in the circumferential direction. Then, one output terminal bolt inserting through hole 138 and two attaching screw inserting through holes 135 are provided at both end parts in the circumferential direction and at the middle part in the circumferential direction of the second cooling plate 123, so as to correspond to the output terminal bolt inserting through hole 134 and the attaching screw inserting through holes 133 provided in the first cooling plate 122, respectively.

The circuit board 125 is a resin molded part having wiring insert-molded for constituting the diode bridge of the positive electrode side and negative electrode side diodes 20, 21, and it is formed approximately like a horseshoe similar to that of the second cooling plate 123. Then, one output terminal bolt inserting through hole 137 and two attaching screw inserting through holes 136 are provided at both end parts in the circumferential direction and at the middle part in the circumferential direction of the circuit board 125, so as to correspond to the output terminal bolt inserting through hole 134 and the attaching screw inserting through holes 133 provided in the first cooling plate 122, respectively.

The insulator 24 is made of, for example, phenol resin, and is formed like a cylinder having a flange part 24a at the peripheral central part. The insulator 27 is made of, for example, phenol resin, and is formed like a cylinder having a flange part 27a at one end part. Furthermore, in the output terminal bolt 26, a knurled groove 26a is provided on the anti-take-out side, and a male screw part 26b is provided on the take-out side.

For assembling this rectifier 120, first of all, the insulator 24 is inserted into each attaching screw inserting through hole 135 of the second cooling plate 123 so that the flange part 24a may come into contact with the main surface 123a. Similarly, the insulator 27 is inserted into the output terminal bolt inserting through hole 138 of the second cooling plate 123 so that the flange part 27a may come into contact with the main surface 123a. Next, the first cooling plate 122 is arranged so that the insulator 24 may be inserted into each attaching screw inserting through hole 133. Consequently, the first and second cooling plates 122, 123 are coaxially arranged so that the main surfaces 122a, 123a may be positioned at the same surface, and are arranged so that the positive electrode side diode 20 and the negative electrode side diode 21 may face to each other. Furthermore, the circuit board 125 is overlapped onto the main surface 123a of the second cooling plate 123 so that the insulator 24 is inserted into each attaching screw inserting through hole 136. Consequently, the connecting terminal 125a of the circuit board 125 is held between the terminals 20a, 21a of the positive electrode side and negative electrode side diodes 20, 21 that are facing to each other, and joined by soldering. Next, the output terminal bolt 26 is inserted into the output terminal bolt inserting through holes 134, 138 of the first and second cooling plates 122, 123 from the output terminal bolt inserting through hole 137 of the circuit board 125. Then, the knurled groove 26a of the output terminal bolt 26 is pressed into the output terminal bolt inserting through hole 134 of the first cooling plate 122, and the output terminal bolt 26 and the first cooling plate 122 are electrically connected, and the rectifier 120 shown in FIG. 6 is assembled.

As shown in FIG. 7, the first and second cooling plates 122, 123 and the circuit board 125 are fastened together by screwing the attaching screw 40 inserted into each of the attaching screw inserting through holes 133, 135, 136 into the screw hole 2a provided in the rear bracket 2, and thereby the rectifier 129 assembled like this is attached. The take-out side of the output terminal bolt 26 connected to the first cooling plate 122 is extending out of the opening 2b pierced in the rear bracket 2. Then, by fastening the output terminal fastening nut 50 screwed onto the male screw part 26b of the output terminal bolt 26, the insulating bush 41 made of phenol resin and mounted on the opening 2b of the bracket 2, the first and second cooling plates 122, 123, and the circuit board 125 are fastened together and fixed to the rear bracket 2.

Then, for connecting the vehicle side connecting terminal 42 made of copper material to the output terminal bolt 26, the connecting terminal 42 is fitted onto the take-out side of the output terminal bolt 26, and furthermore, the nut 44 is screwed onto the male screw part 26b. Then, by fastening the nut 44, the connecting terminal 42 is fastened and fixed onto the outer end surface of the nut 50. Here, the outer end surface of the output terminal-fastening nut 50 constitute the fastening seat.

Here, the first and second cooling plates 122, 123, the circuit board 125, and the insulating bush 41 are fastened together and fixed to the rear bracket 2 by the fastening force of the output terminal fastening nut 50, and therefore, even if the vibration based on the weight of the wire harness or the like from the vehicle is transmitted to the vehicle side connecting terminal 42, there is no displacement in the axial direction of the output terminal bolt 26, and initially, damage or the like of the rectifier 120 can be prevented. Furthermore, since the fastening force of the nut 44 is received by the outside surface of the output terminal-fastening nut 50 constituting the fastening seat, the fastening force of the vehicle side connecting terminal 42 is ensured initially.

In a conventional AC generator, the distance between the fastening nut 44 and the output terminal fastening nut 50 is short, and the wire harness is held by the tensile stress based on the elongation of the output terminal bolt 26 at that part, and therefore, as understood from Hook's law: σ=E·λ=E·(ΔA/A), in a conventional device, the elongation ΔA at that part is small under a condition that the fastening torque is fixed (σ is fixed) since A is short. Therefore, the displacement in the circumferential direction of the nut 44 corresponding to the control upper limit value to the lower limit value of the torque is small, and there has been such a problem that the control for performing the fastening by a specified torque is difficult when fastening the nut 44. Furthermore, when considering the case where the fastening is performed by a torque out of a range from the upper limit of the control value to the lower limit of the control value, in the state where the fastening force exceeds the control upper limit value and the fastening is too tight, the tensile stress is extremely increased and the output terminal bolt 26 is broken. Conversely, in the case of the state where the fastening force is below the control lower limit value and the fastening is loosened, there has been such a problem that the torsional moment acts on the nut 44 to cause a malfunction of slipping-off of the nut 44 only by a weak vibration from the wire harness side.

Even in the case where the nut 44 is fastened by a control value, when an excessive torsional moment acts by a vibration from the wire harness, the fastening torque is extremely lost only by the occurrence of loosening because of a little displacement, and the slipping-off of the nut 44 is caused. Conversely, in the case where the nut 44 is fastened by a minute displacement, there has been such a malfunction that the tensile stress is extremely increased in the bolt 26 to break the bolt 26. Furthermore, there has been such a problem that ΔA is small and therefore, in the case where a compressive or tensile force acts on the output terminal bolt 26 in the axial direction of the output terminal bolt 26 by the vibration from the wire harness, the loosening of the nut 44 is caused by the decrease of the fastening force of the wire harness and the slipping-off of the nut 44 is caused when the number of cycles of the vibration is increased.

The present invention is made for solving such a problem, and it is an object to obtain a vehicle AC generator, in which it is easy to control the suitable fastening torque and in the meantime, the slipping-off of the nut is prevented and the damage of the output terminal bolt at the wire harness holding part caused by the excessive fastening of the bolt is prevent, so that the connection reliability of the vehicle side connecting terminal may be improved.

SUMMARY OF THE INVENTION

A vehicle AC generator according to a first aspect of the invention comprises:
a bracket having an opening;
a cylindrical insulating bush mounted on the opening;
an output terminal bolt inserted through the insulating bush to project out of the bracket and fixed to the bracket;
a fastening nut capable of being screwed onto the output terminal bolt to mount a vehicle side connecting terminal; and
a bush provided between the insulating bush and the vehicle side connecting terminal by being fitted onto the output terminal bolt,
wherein the fastening nut is screwed onto a screw part on a take-out end part side of the output terminal bolt so that the vehicle side connecting terminal is held between the bush and the fastening nut.

In a second aspect of the invention, there is provided a vehicle AC generator according to the first aspect of the invention, wherein the bush having:
a bushing part loosely fitted onto the output terminal bolt; and
a fixed part fixed to the output terminal bolt on the opposite side of the vehicle side connecting terminal of the bushing part.

A vehicle AC generator according to a third aspect of the invention comprises:
a bracket having a first opening;
a cylindrical projecting part formed on the bracket projecting to surround the first opening, the cylindrical projecting part having a second opening at the projecting end;
a cylindrical first insulating bush mounted on the first opening;
a cylindrical second insulating bush mounted on the second opening;
an output terminal bolt inserting through the first and second insulating bushes to project out of the bracket, the output terminal bolt fixed to the bracket;
a fastening nut capable of being screwed onto the output terminal bolt to mount a vehicle side connecting terminal; and
a bush provided between the first insulating bush and the vehicle side connecting terminal by being fitted onto the output terminal bolt, the bush having a bushing part loosely fitted onto the output terminal bolt and a fixed part fixed to the output terminal bolt between the first insulating bush and the second insulating bush,
wherein the fastening nut is screwed onto a screw part on a take-out end part side of the output terminal bolt so that the vehicle side connecting terminal is held between the bushing and the fastening nut.

In a fourth aspect of the invention, there is provided the vehicle AC generator according to any one of first to third aspects of the inveniton, further comprising:
a rotor rotatably supported by the bracket;
a stator fixed to the bracket to surround the rotor on the peripheral side of the rotor;
a rectifier including:
a first cooling plate having a plurality of first diodes, the first cooling plate fixed to the bracket; and
a second cooling plate having a plurality of second diodes whose polarity are different from that of the first diodes, the second cooling plate fixed to the bracket
wherein the bracket is made of metal.

In a fifth aspect of the invention, there is provided the vehicle AC generator according to any one of the first to fourth aspects of the invention, wherein a length of the bushing part is set to two times or more as large as an outside diameter of the output terminal bolt.

In a sixth aspect of the invention, there is provided the vehicle AC generator according to any one of the second to fifth aspects of the invention, wherein the fixed part includes a nut having a female screw.

DETAILED DESCRIPTION OF THE PREFERRED EMBODIMENTS

Preferred embodiments of this invention will be described below according to the drawings.
(Embodiment 1)

Figure 1:
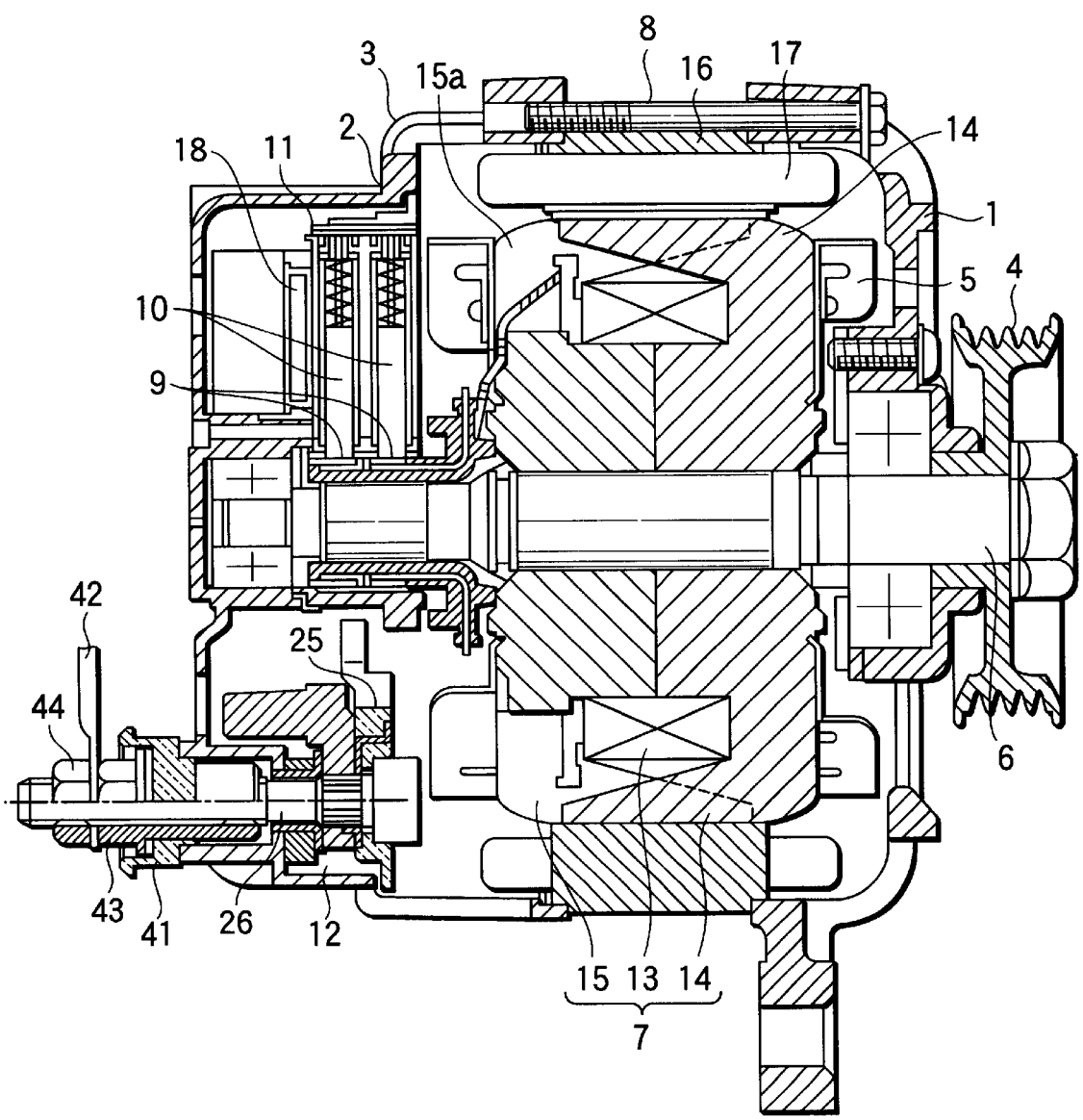
FIG. 1 is a cross sectional view showing a vehicle AC generator according to an embodiment 1 of the invention.
Figure 2:
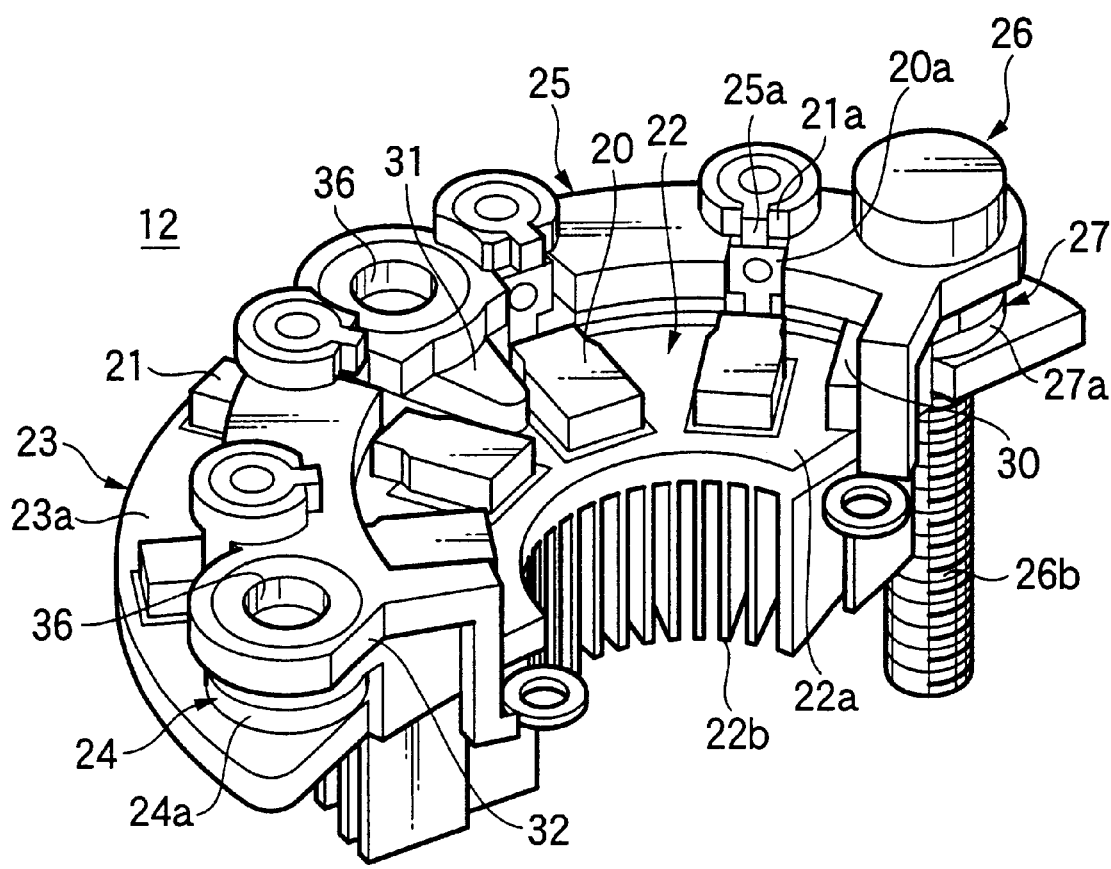
FIG. 2 is an perspective view showing a rectifier applied to the vehicle AC generator according to the embodiment 1 of the invention.
Figure 3:
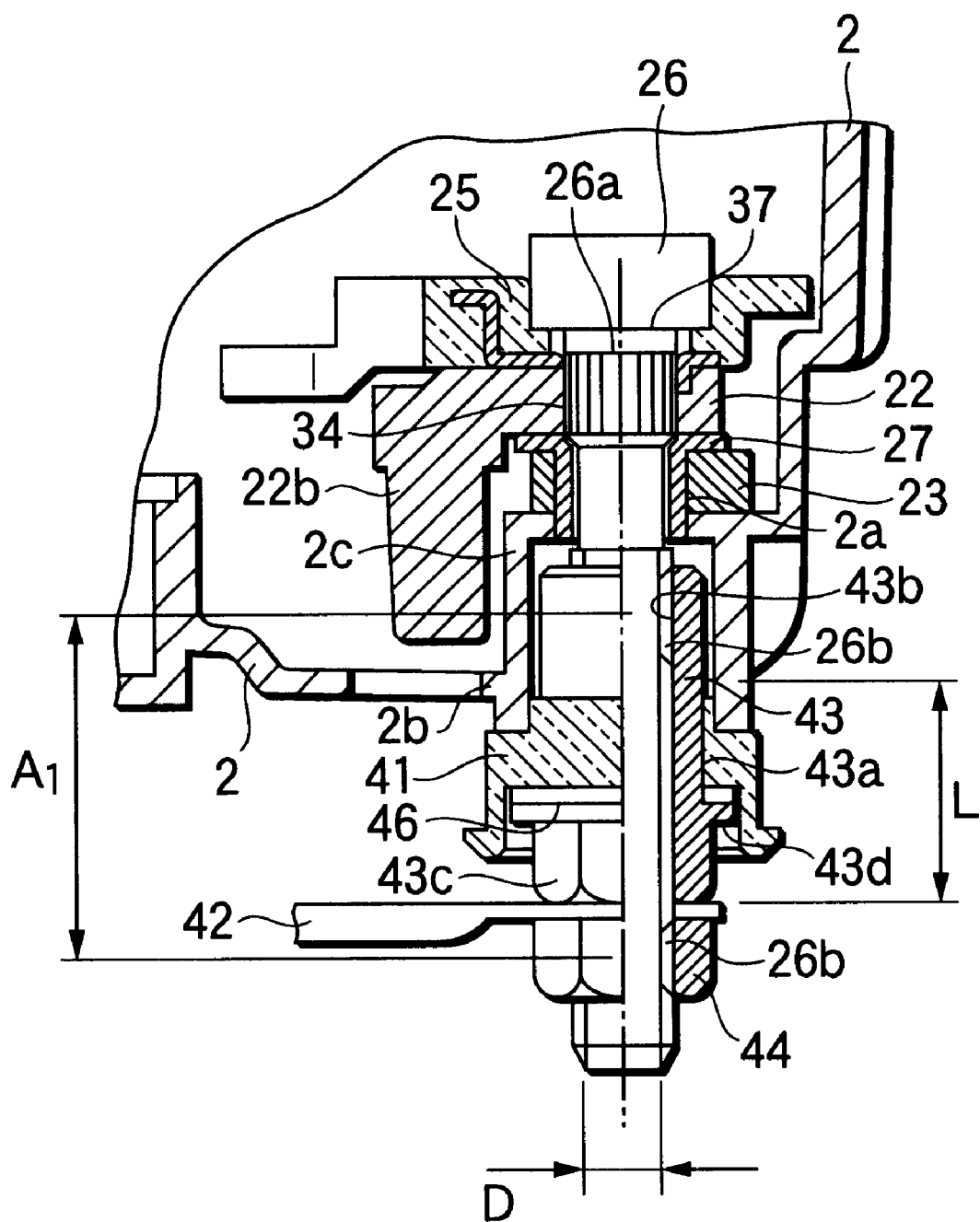
FIG. 3 is a cross sectional view of a main part showing an output take-out structure in the vehicle AC generator according to the embodiment 1 of the invention.

FIG. 1 is a cross sectional view showing a vehicle AC generator according to an embodiment 1 of the invention, and FIG. 2 is an perspective view showing a rectifier applied to the vehicle AC generator according to the embodiment 1 of the invention, and FIG. 3 is a cross sectional view of a main part showing an output take-out structure in the vehicle AC generator according to the embodiment 1 of the invention.

In each figure, the vehicle AC generator comprises: a case 3 having a front bracket 1 and a rear bracket 2 that are made of aluminum; a shaft 6 provided in the case 3 and having a pulley 4 fixed to one end part; a Landolt type rotor 7 fixed to the shaft 6; fans 5 fixed to both end parts in the axial direction of the rotor 7; a stator 8 fixed to the case 3 to surround the rotor 7; a slip ring 9 fixed to the other end part of the shaft 6 to supply electric current to the rotor 7; a pair of brushes 10 sliding on the surface of the slip ring 9; a brush holder 11 for containing these brushes 10; a rectifier 12 electrically connected to the stator 8 to rectify the AC created in the stator 8 to DC; and a regulator 18 fitted on the brush holder 11 to regulate the magnitude of the AC voltage created in the stator 8.

The rotor 7 comprises: a field coil 13 for letting electric current flow to create the magnetic flux; and a pair of pole cores 14, 15 which are provided to cover this field coil 13 and whose magnetic flux forms the magnetic pole. The pair of pole cores 14, 15 are made of steel, and they are arranged such that claw shaped magnetic poles 14a, 15a, whose outermost diameter surfaces are shaped approximately like trapezoids, are provided to project in the circumferential direction at the peripheral edge part at equal angular pitches, and the pair of pole cores 14, 15 are fixed to the shaft 6 in such a way where these claw shaped magnetic poles 14a, 15a face to each other to engaging with each other.

The stator 8 comprises: a cylindrical stator iron core 16 made by laminating magnetic steel plates and a stator winding 17 wound around the stator iron core 16. Then, the stator 8 is held between the front bracket 1 and the rear bracket 2 so as to form a uniform air gap between the peripheral surface of the claw shaped magnetic poles 14a, 15a and the inner peripheral surface of the stator iron core 16.

As shown in FIG. 2, the rectifier 12 comprises: a plurality of positive electrode side and negative electrode side diodes 20, 21 for full-wave-rectifying the three-phase AC; first and second cooling plates 22, 23 for cooling the positive electrode side and negative electrode side diodes 20, 21, respectively; an insulator 24 for insulating the first and second cooling plates 22, 23; a circuit board 25; and an output terminal bolt 26 made of brass.

The first cooling plate 22 is formed approximately like a horseshoe, and the positive electrode side diode 20 is attached side by side in the circumferential direction on a main surface 22a thereof. Then, a heat radiating fin 22b is provided rising from the rear surface (surface on the opposite side of the main surface) of the first cooling plate 22. Furthermore, three flanges 30, 31, 32 are provided at both end parts in the circumferential direction and at the middle part in the circumferential direction of the first cooling plate 22, respectively. The flange part 30 provided at one end part in the circumferential direction of the first cooling plate 22 is provided to rise from the main surface 22a of the first cooling plate 22 and to extend outward in the radial direction, and furthermore, to extend outward in the circumferential direction, and an attaching screw inserting through hole is pierced in the extending-out end in the radial direction thereof, and an output terminal inserting through hole 34 is pierced in the extending-out end in the circumferential direction thereof. Moreover, the residual flange parts 31, 32 are provided to rise from the main surface 22a of the first cooling plate 22 and to extend outward in the radial direction, and an attaching screw inserting through hole (not shown in the figure) is pierced in the extending-out end in the radial direction thereof.

The second cooling plate 23 is formed approximately like a horseshoe whose diameter is larger than that of the first cooling plate 22, and a negative electrode side diode 21 is attached side by side in the circumferential direction on the main surface 23a thereof. Then, three attaching screw inserting through holes are provided at both end parts in the circumferential direction and at the middle part in the circumferential direction of the second cooling plate 23 corresponding to each attaching screw inserting through hole provided in the first cooling plate 22, respectively.

The circuit board 25 is a resin molded part in which wiring for constituting a diode bridge of the positive electrode side and negative electrode side diodes 20, 21 is insert-molded, and is formed approximately like a horseshoe similar to that of the second cooling plate 23. Three attaching screw inserting through holes are provided at both end parts in the circumferential direction and at the middle part in the circumferential direction of the circuit board 25 corresponding to each attaching screw inserting through hole provided in the first cooling plate 22, respectively. Furthermore, an output terminal inserting through hole 37 is provided in one end part in the circumferential direction of the circuit board 25 to correspond to the output terminal inserting through hole 34 provided in the first cooling plate 22.

The insulator 24 is made of, for example, phenol resin, and is formed like a cylinder having a flange part 24a at the peripheral central part. Furthermore, in the output terminal bolt 26, a knurled groove 26a is provided on the opposite side of the take-out side, and a male screw part 26b is provided on the take-out side.

The bracket 2 has a first opening 2a on which a cylindrical insulating bush 27 is mounted, and a cylindrical projecting part 2c which is formed to project in the axial direction surrounding the first opening 2a and which has a second opening 2b in the projecting end thereof. On the described second opening 2b, a cylindrical second insulating bush 41 is mounted.

The metal bush 43 is formed of a steel material and, includes a bushing part 43a, which is loosely fitted onto the output terminal bolt 26 and to which no screw is formed, and a fixed part 43b to which a female screw is formed at the end part.

At the end part constructing the described bushing 43a, a fastening nut 43c is formed, and at the end of this nut 43c, a flange 43d is integrally formed. The size in the axial direction of the described bushing part 43a, to which no screw is formed, is set at the comparatively large size L.

Between the flange 43d of the nut 43c and the second insulating bush 41, a washer 46 is mounted.

For assembling this rectifier 12, first, the insulator 24 is inserted into each attaching screw inserting through hole of the second cooling plate 23 so that the flange part 24a comes into contact with the main surface 23a. Next, the first cooling plate 22 is arranged so that the insulator 24 is inserted into each attaching screw inserting through hole. Thereby, the first and second cooling plates 22, 23 are coaxially arranged so that the main surfaces 22a, 23a is positioned at the same surface, and the first and second cooling plates 22, 23 are arranged so that the positive electrode side diodes 20 and the negative electrode side diodes 21 face to each other. Furthermore, the circuit board 25 is overlapped on the main surface 23a of the second cooling plate 23 so that the insulator 24 is inserted into each attaching screw inserting through hole. Thereby, the connecting terminal 26a of the circuit board 25 is held between the terminals 20a, 21a of the positive electrode side and negative electrode side diodes 20, 21 facing to each other to be joined by soldering. Next, the output terminal bolt 26 is inserted into the output terminal bolt inserting through hole 34 of the first cooling plate 22 from the output terminal bolt inserting through hole of the circuit board 25. Then, the knurled groove 26a of the output terminal bolt 26 is pressed into the output terminal bolt inserting through hole 34 of the first cooling plate 22, and the output terminal 26 and the first cooling plate 22 are electrically connected, and the rectifier 12 shown in FIG. 2 is assembled.

As shown in FIG. 3, the first and second cooling plates 22, 23 and the circuit board are fastened together by fixing the attaching screw inserted into each attaching screw inserting hole to the screw hole provided in the rear bracket 2 so that the rectifier 12 assembled like this is attached. The take-out side of the output terminal bolt 26 connected to the first cooling plate 22 is extended out of the opening 2b pierced in the rear bracket 2. Then, the insulating bush 41 made of phenol resin is mounted on the opening 2b.

Then, for connecting a vehicle side connecting terminal 42 to the output terminal bolt 26, first, the cylindrical metal bush 43 is loosely inserted into the insulating bush 41 from the take-out side of the output terminal bolt 26 to be fitted onto the output terminal bolt 26, and the female screw 43b of the metal bush 43 is screwed onto the male screw part 26b of that output terminal bolt 26. Next, the connecting terminal 42 is fitted onto the take-out side of the output terminal bolt 26, and furthermore, the nut 44 is screwed onto the male screw part 26b. Then, by fastening the nut 44, the connecting terminal 42 is fastened and fixed between the nut 44 and the nut 43c of the metal bush 43. Here, one end surface of the metal bush 43 constructs a fastening seat.

In the vehicle AC generator constructed like this, electric current is supplied to the field coil 13 through the brush 10 and the slip ring 9 from the battery (not shown in the figure) and the magnetic flux is generated. By this magnetic flux, the claw-shaped magnetic pole 14a of the pole core 14 is polarized to N-pole, and the claw-shaped magnetic pole 15a of the pole core 15 is polarized to S-pole.

On the other hand, the pulley 4 is driven by an engine, and, the rotor 7 is rotated by the shaft 6. By this rotation of the rotor 7, rotating magnetic field is given to the stator iron core 16 and electromotive force is generated in the stator winding 17. This AC electromotive force generated in the stator 8 is rectified to DC by the rectifier 12 and in the meantime, the magnitude of the output voltage thereof is regulated by the regulator 18. Then, an output of the rectifier 12 is charged in the battery through the output terminal 26 and the vehicle side connecting terminal 42.

According to the embodiment 1 of the invention, it is constructed that the distance (size in the axial direction) A1 between the center of the fastening nut 44 and the center of the fixed part 43b of the metal bush 43 can drastically be larger than the similar distance A of the conventional device, and the size L in the axial direction of the bushing part 43a existing between them is set long.

Accordingly, a wire harness is held by tensile stress caused by elongation of the output terminal bolt 26, and therefore, as understood from Hook's law: $\sigma = E \cdot \lambda = E \cdot (\Delta A/A)$, the elongation $\Delta A$ at the part is large under the condition that the fastening torque is fixed ($\sigma$ is fixed). Therefore, the displacement in the circumferential direction of the nut 44 corresponding to the control upper limit value to the lower limit value of the torque is wide, and the control for fastening by a specified torque is easy when fastening the nut 44, and it hardly occurs to fasten by a torque out of a range from the upper limit of the control value to lower limit of the control value, and the malfunction such as the damage of the output terminal bolt 26 or the slipping-off of the nut 44 has extremely be decreased.

Furthermore, such a malfunction that when an excessive torsional moment acts because of vibration of the wire harness, the fastening torque is extremely lost only by the occurrence of the loosening because of a minute displacement and the slipping-of of the nut 44 is caused even in the case where the nut 44 is fastened by the control value, has disappeared. Conversely, such a malfunction that the tensile stress is extremely increased in the output terminal bolt 26 and the bolt is broken in the case where the nut 44 is fastened by a minute displacement, has also disappeared. Furthermore, since $\Delta A$ is large, in the case where force compressing or pulling the output terminal bolt 26 acts in the axial direction of the output terminal bolt 26 because of the vibration from the wire harness, it does not occur for the fastening force of the wire harness to be extremely decreased, and therefore, such a malfunction that the loosening of the nut 44 is caused and when the number of cycles of the vibration is increased, the slipping-off of the nut 44 is caused, has disappeared.

Figure 4:
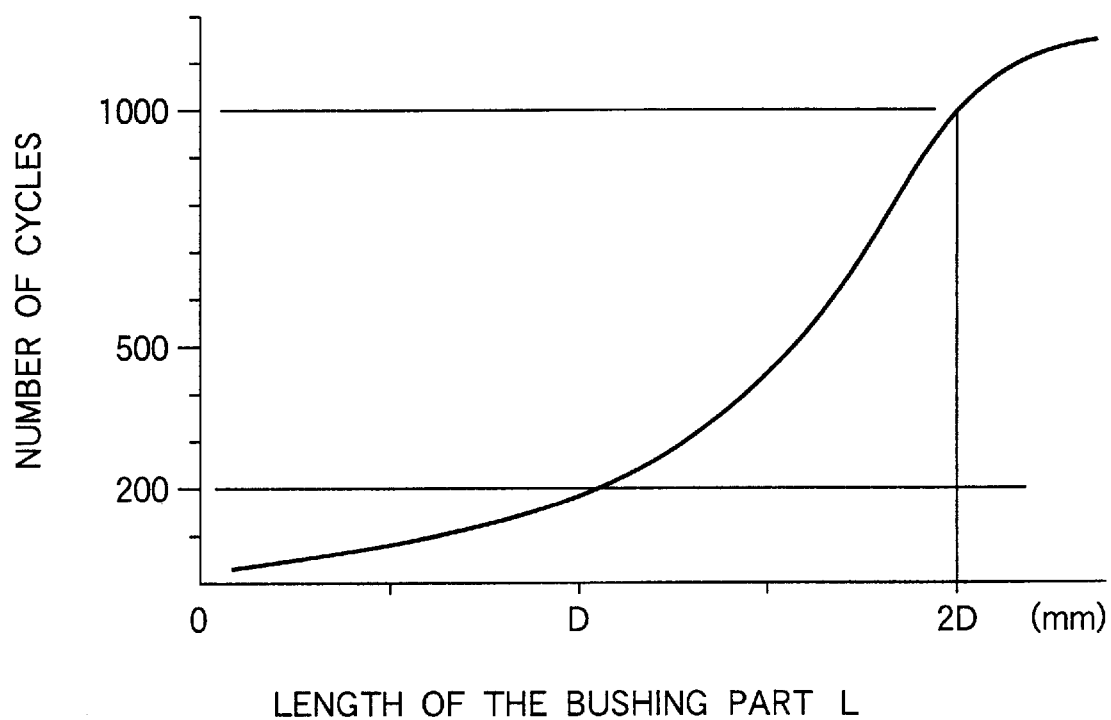
FIG. 4 is a data curve for describing an operational effect of the vehicle AC generator according to the embodiment 1 of the invention.

Furthermore, since the size L in the axial direction of the bushing part 43a is set at two times the outside diameter D of the male screw 26b of the output terminal bolt 26 or more, as shown in FIG. 4, the number of cycles at which the loosening of the nut 44 is caused by the vibration is far improved.

Furthermore, the device of the embodiment 1 is constructed so that the projecting part 2c is provided in the bracket 2, and half or more of the output terminal bolt 26 and the metal bush 43 can be contained in the projecting part 2c, and therefore, the projecting length from the bracket 2 of the output terminal bolt 26 and the metal bush 43 can be made short comparatively, not to interfere with other devices, and the performance of layout can be good. Furthermore, bending moment applied to the output terminal bolt 26 can be reduced, and the breaking of the output terminal bolt 26 can be decreased. Moreover, the electric conductivity is improved when using a metal such as copper or steel for the bush 43, and the heat generation of the output terminal bolt 26 can be reduced. Furthermore, a bolt made of brass is used for the output terminal bolt 26, but by using a bolt made of steel, limit of stress is further raised, and the malfunction of causing the breaking is decreased. Furthermore, in the device of the embodiment 1, the washer 43d is formed integrally with the metal bush 43, and therefore, the operating performance is good.

(Embodiment 2)

Figure 5:
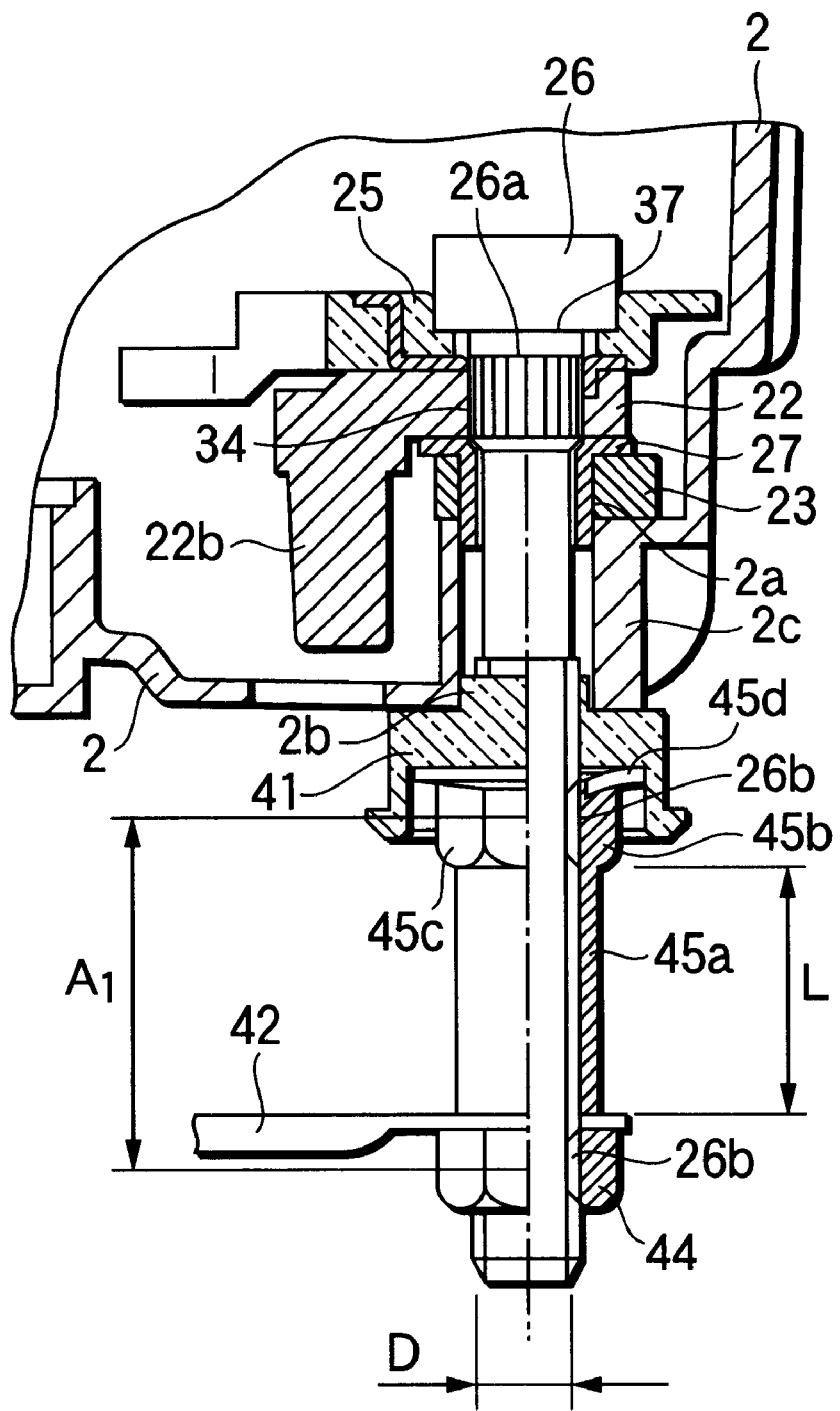
FIG. 5 is a cross sectional view of a main part showing an output take-out structure in a vehicle AC generator according to an embodiment 2 of the invention.
Figure 6:
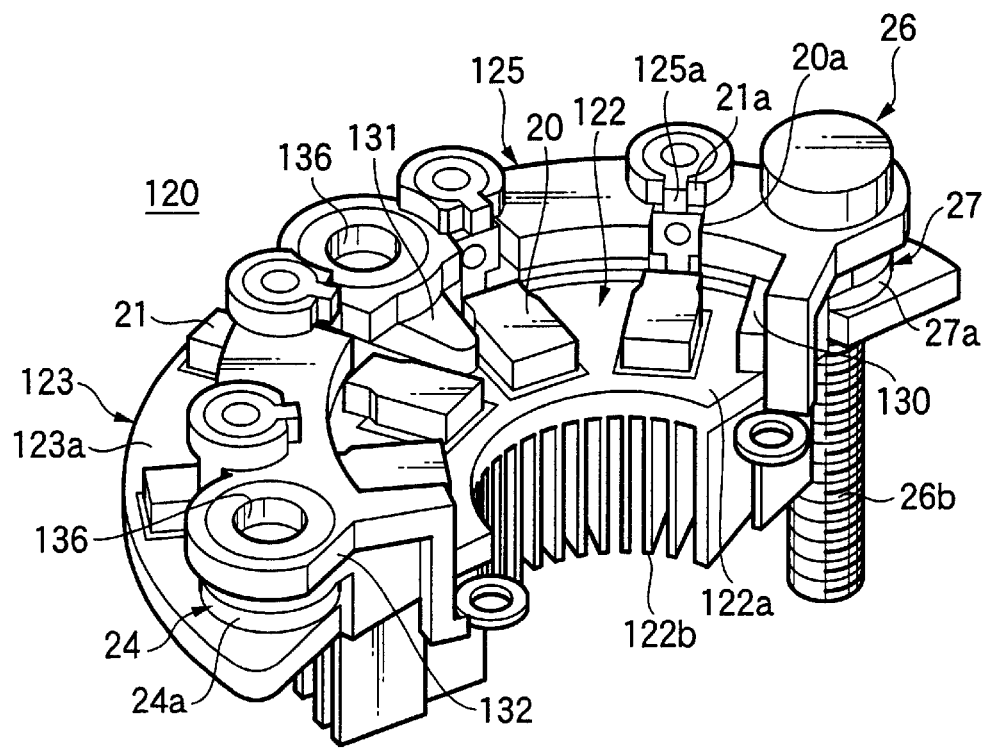
FIG. 6 is an perspective view showing a rectifier applied to a conventional vehicle AC generator.
Figure 7:
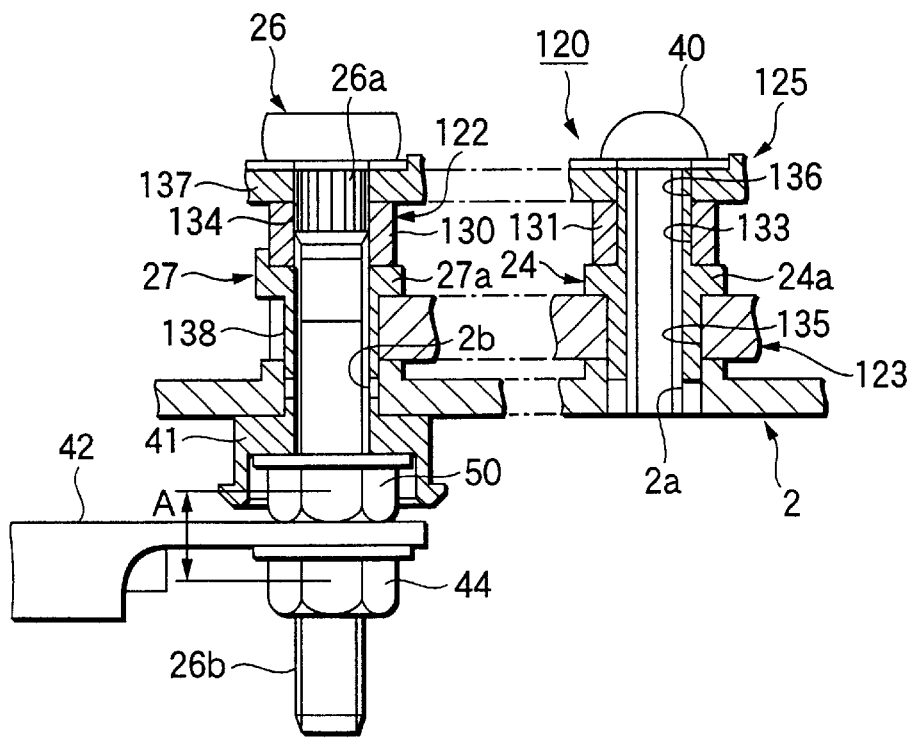
FIG. 7 is a cross sectional view of a main part showing an output take-out structure in the conventional vehicle AC generator.

In this embodiment 2, as shown in FIG. 5, the fixed part 45b of the metal bush 45 is provided on the outside of the bracket 2, and the lengths of the output terminal bolt 26 and the metal bush 45 projecting out of the bracket 2 can be made larger than those of the embodiment 1. Reference numeral 45a denotes the bushing part, and the bushing part 45a is loosely fitted onto the output terminal bolt 26, and the length in the axial direction thereof is set at L. Reference numeral 45c denotes the nut, and the nut 45c is formed on the periphery of the fixed part 45b. Reference numeral 45d denotes a washer, and the washer 45d is provided integrally with the nut 45c.

In the device of the embodiment 2, it is constructed that the distance (size in the axial direction) A1 between the center of the fastening nut 44 and the center of the fixed part 45b of the metal bush 45 can extremely be made larger than the similar distance A of the conventional device, and the size L in the axial direction of the bushing part 45a existing between them is set long to be two times the diameter of the screw part of the output terminal bolt 26 or more. Accordingly, similarly to the described embodiment 1, the range from the control upper limit value to the control lower limit value of the fastening torque of the nut 44 fastened by the output terminal bolt 26 can be set large, and therefore, the damage of the output terminal bolt 26 caused by the increase of the fastening torque of the fastening nut 44 can be prevented.

Furthermore, even if the fastening nuts 44, 45c receive vibration through the wire harness of the vehicle side connecting terminal 42, the size L in the axial direction is set long, and therefore, the control of the fastening torque of the fastening nut 44 can easily be performed, and accordingly, it does not occur for the fastening torque to be set extremely small, and consequently, it is difficult for the fastening nut 44 to be loosened.

(Embodiment 3)

In each of the described embodiments, a device is shown, where the fixing is performed by screwing the fixed part (female screw) of the metal bushes 43, 45 onto the male screw 26b of the output terminal bolt 26. However, it is also possible that the fixed part of the metal bushes 43, 45 are fixed at the specified position of the output terminal bolt 26 not by screwing but by press-fitting.

(Embodiment 4)

In each of the described embodiments, a device is exemplified, where the output terminal bolt 26 is projected in the axial direction from the bracket 2 to be connected to the vehicle side connecting terminal 42. However, the effect similar to that of each of the described embodiments can also be taken by projecting the output terminal bolt 26 in the radial direction from the bracket 2.

(Embodiment 5)

In each of the described embodiments, a device is exemplified, where the bushes 43, 45 are made of a metal such as steel or copper. However, the bushes 43, 45 can also be made of ceramics or the like.

[Effect of the Invention]

The vehicle AC generator according to the first aspect of the invention, comprises:

a bracket having an opening;

a cylindrical insulating bush mounted on the opening;

an output terminal bolt inserted through the insulating bush to project out of the bracket and fixed to the bracket;

a fastening nut capable of being screwed onto the output terminal bolt to mount a vehicle side connecting terminal; and a bush provided between the insulating bush and the vehicle side connecting terminal by being fitted onto the output terminal bolt, wherein the fastening nut is screwed onto a screw part on a take-out end part side of the output terminal bolt so that the vehicle side connecting terminal is held between the bush and the fastening nut. Therefore, the distance between the fastening nut and the fixed part of the bush can be set large. Accordingly, since the range from the control upper limit value to the control lower limit value in the fastening torque of the nut screwed onto the output terminal bolt can be set large, the damage of the output terminal bolt caused by the increase of the fastening torque of the fastening nut can be prevented. Furthermore, even when the fastening nut or the like receives vibration through the wire harness, since the control of the fastening torque of the fastening nut can properly be performed because the distance between the fastening nut and the fixed part of the bush is set long, it is difficult for the loosening of the fastening nut to be caused. Consequently, the connection reliability of the vehicle side connecting terminal can also be improved.

In the second aspect of the invention, there is provided the vehicle AC generator according to the first aspect of the invention, wherein the bush having:

a bushing part loosely fitted onto the output terminal bolt; and a fixed part fixed to the output terminal bolt on the opposite side of the vehicle side connecting terminal of the bushing part. Therefore, the distance between the fastening nut and the fixed part of the bush can be set large. Accordingly, since the range from the control upper limit value to the control lower limit value in the fastening torque of the nut screwed onto the output terminal bolt can be set large, the damage of the output terminal bolt caused by the increase of the fastening torque of the fastening nut can be prevented. Furthermore, even when the fastening nut or the like receives vibration through the wire harness, since the control of the fastening torque of the fastening nut can properly be performed because the distance between the fastening nut and the fixed part of the bush is set long, it is difficult for the loosening of the fastening nut to be caused. Consequently, the connection reliability of the vehicle side connecting terminal can also be improved.

The vehicle AC generator according to the third aspect of the invention, comprises:

a bracket having a first opening;

a cylindrical projecting part formed on the bracket projecting to surround the first opening, the cylindrical projecting part having a second opening at the projecting end;

a cylindrical first insulating bush mounted on the first opening;

a cylindrical second insulating bush mounted on the second opening;

an output terminal bolt inserting through the first and second insulating bushes to project out of the bracket, the output terminal bolt fixed to the bracket;

a fastening nut capable of being screwed onto the output terminal bolt to mount a vehicle side connecting terminal; and a bush provided between the first insulating bush and the vehicle side connecting terminal by being fitted onto the output terminal bolt, the bush having a bushing part loosely fitted onto the output terminal bolt and a fixed part fixed to the output terminal bolt between the first insulating bush and the second insulating bush, wherein the fastening nut is screwed onto a screw part on a take-out end part side of the output terminal bolt so that the vehicle side connecting terminal is held between the bushing and the fastening nut. Therefore, the distance between the fastening nut and the fixed part of the bush can be set large. Accordingly, since the range from the control upper limit value to the control lower limit value in the fastening torque of the nut screwed onto the output terminal bolt can be set large, the damage of the output terminal bolt caused by the increase of the fastening torque of the fastening nut can be prevented. Furthermore, even when the fastening nut or the like receives vibration through the wire harness, since the control of the fastening torque of the fastening nut can properly be performed because the distance between the fastening nut and the fixed part of the bush is set long, it is difficult for the loosening of the fastening nut to be caused. Consequently, the connection reliability of the vehicle side connecting terminal can also be improved.

Furthermore, since the projecting length from the bracket of the output terminal bolt can be made short, it does not interfere with other devices. Moreover, the bending moment applied to the output terminal bolt is also decreased. Therefore, the tensile stress acting on the output terminal bolt can be reduced, and consequently, the damage of the output terminal bolt can furthermore be prevented.

In the fourth aspect of the invention, the vehicle AC generator according to any one of the first to third aspects of the invention, further comprises:

a rotor rotatably supported by the bracket;

a stator fixed to the bracket to surround the rotor on the peripheral side of the rotor;

a rectifier including:
a first cooling plate having a plurality of first diodes, the first cooling plate fixed to the bracket; and
a second cooling plate having a plurality of second diodes whose polarity are different from that of the first diodes, the second cooling plate fixed to the bracket wherein the bracket is made of metal. Therefore, the distance between the fastening nut and the fixed part of the bush can be set large. Accordingly, since the range from the control upper limit value to the control lower limit value in the fastening torque of the nut screwed onto the output terminal bolt can be set large, the damage of the output terminal bolt caused by the increase of the fastening torque of the fastening nut can be prevented. Furthermore, even when the fastening nut or the like receives vibration through the wire harness, since the control of the fastening torque of the fastening nut can properly be performed because the distance between the fastening nut and the fixed part of the bush is set long, it is difficult for the loosening of the fastening nut to be caused. Consequently, the connection reliability of the vehicle side connecting terminal can also be improved. Furthermore, since the rectifier can be fixed to the bracket through the output terminal bolt, the rectifier can firmly be held, and there is such an effect that an action of the rectifier can surely be performed.

In the fifth aspect of the invention, there is provided the vehicle AC generator according to any one of the first to fourth aspects of the invention, wherein a length of the bushing part is set to two times or more as large as an outside diameter of the output terminal bolt. Therefore, the range from the control upper limit value to the control lower limit value in the fastening torque of the fastening nut screwed onto the output terminal bolt can be set large. Accordingly, the damage of the output terminal bolt caused by the increase of the fastening torque of the fastening nut can be prevented. Furthermore, even when the fastening nut or the like receives vibration through the wire harness, the loosening of the fastening nut can surely be prevented since the control of the fastening torque of the fastening nut can properly be performed. Consequently, the connection reliability of the vehicle side connecting terminal can considerably be improved.

In the sixth aspect of the invention, there is provided the vehicle AC generator according to any one of the second to fifth aspects of the invention, wherein the fixed part includes a nut having a female screw. Therefore, there are such effects that the fixing of the bush becomes easy and in the meantime, the fixing can surely be performed.

What is claimed is:

1. A vehicle AC generator comprising:

a bracket having an opening;

a cylindrical insulating bush mounted on the opening;

an output terminal bolt inserted through the insulating bush to project out of the bracket and fixed to the bracket;

a fastening nut capable of being screwed onto the output terminal bolt to mount a vehicle side connecting terminal; and a bush provided between the insulating bush and the vehicle side connecting terminal by being fitted onto the output terminal bolt, wherein the fastening nut is screwed onto a screw part on a take-out end part side of the output terminal bolt so that the vehicle side connecting terminal is held between the bush and the fastening nut.

2. The vehicle AC generator according to claim 1, wherein the bush having:

a bushing part loosely fitted onto the output terminal bolt; and a fixed part fixed to the output terminal bolt on the opposite side of the vehicle side connecting terminal of the bushing part.

3. The vehicle AC generator according to claim 2, further comprising:

a rotor rotatably supported by the bracket;

a stator fixed to the bracket to surround the rotor on the peripheral side of the rotor;

a rectifier including:
   a first cooling plate having a plurality of first diodes, the first cooling plate fixed to the bracket; and
   a second cooling plate having a plurality of second diodes whose polarity are different from that of the first diodes, the second cooling plate fixed to the bracket
wherein the bracket is made of metal.

4. The vehicle AC generator according to claim 2, wherein a length of the bushing part is set to two times or more as large as an outside diameter of the output terminal bolt.

5. The vehicle AC generator according to claim 2, wherein the fixed part is formed of a nut having a female screw.

6. The vehicle AC generator according to claim 1, further comprising:
   a rotor rotatably supported by the bracket;
   a stator fixed to the bracket to surround the rotor on the peripheral side of the rotor;
   a rectifier including:
      a first cooling plate having a plurality of first diodes, the first cooling plate fixed to the bracket; and
      a second cooling plate having a plurality of second diodes whose polarity are different from that of the first diodes, the second cooling plate fixed to the bracket
   wherein the bracket is made of metal.

7. The vehicle AC generator according to claim 6, wherein a length of the bushing part is set to two times or more as large as an outside diameter of the output terminal bolt.

8. The vehicle AC generator according to claim 1, wherein a length of the bushing part is set to two times or more as large as an outside diameter of the output terminal bolt.

9. The vehicle AC generator according to claim 1, wherein the bush comprises:
   a first portion fixed to the output terminal; and
   a second portion formed to the bush and surrounding the output terminal bolt,
   wherein the fastening nut is screwed onto a screw part on a take-out end side of the output terminal bolt so that the vehicle side connecting terminal is held between the second portion and the fastening nut.

10. The vehicle AC generator according to claim 1, wherein the bush, the output terminal bolt, and the fastening nut, are arranged so that when the fastening nut is screwed onto the screw part on the take-out end part side of the output terminal bolt so that the vehicle side connecting terminal is held between the bush and the fastening nut, an axial load is generated on the output terminal bolt by the bush and the fastening nut.

11. A vehicle AC generator comprising:
   a bracket having a first opening;
   a cylindrical projecting part formed on the bracket projecting to surround the first opening, the cylindrical projecting part having a second opening at the projecting end;
   a cylindrical first insulating bush mounted on the first opening;
   a cylindrical second insulating bush mounted on the second opening;
   an output terminal bolt inserting through the first and second insulating bushes to project out of the bracket, the output terminal bolt fixed to the bracket;
   a fastening nut capable of being screwed onto the output terminal bolt to mount a vehicle side connecting terminal; and
   a bush provided between the first insulating bush and the vehicle side connecting terminal by being fitted onto the output terminal bolt, the bush having a bushing part loosely fitted onto the output terminal bolt and a fixed part fixed to the output terminal bolt between the first insulating bush and the second insulating bush,
   wherein the fastening nut is screwed onto a screw part on a take-out end part side of the output terminal bolt so that the vehicle side connecting terminal is held between the bushing and the fastening nut.

12. The vehicle AC generator according to claim 11, further comprising:
   a rotor rotatably supported by the bracket;
   a stator fixed to the bracket to surround the rotor on the peripheral side of the rotor;
   a rectifier including:
      a first cooling plate having a plurality of first diodes, the first cooling plate fixed to the bracket; and
      a second cooling plate having a plurality of second diodes whose polarity are different from that of the first diodes, the second cooling plate fixed to the bracket
   wherein the bracket is made of metal.

13. The vehicle AC generator according to claim 11, wherein a length of the bushing part is set to two times or more as large as an outside diameter of the output terminal bolt.

14. The vehicle AC generator according to claim 11, wherein the fixed part is formed of a nut having a female screw.

15. The vehicle AC generator according to claim 11, wherein the bush, the output terminal bolt, and the fastening nut, are arranged so that when the fastening nut is screwed onto the screw part on the take-out end part side of the output terminal bolt so that the vehicle side connecting terminal is held between the bush and the fastening nut, an axial load is generated on the output terminal bolt by the bush and the fastening nut.

* * * * *